I. L. DAWSON.
STALK ELEVATOR FOR CORN HARVESTERS.
APPLICATION FILED FEB. 1, 1910.
985,573.
Patented Feb. 28, 1911.
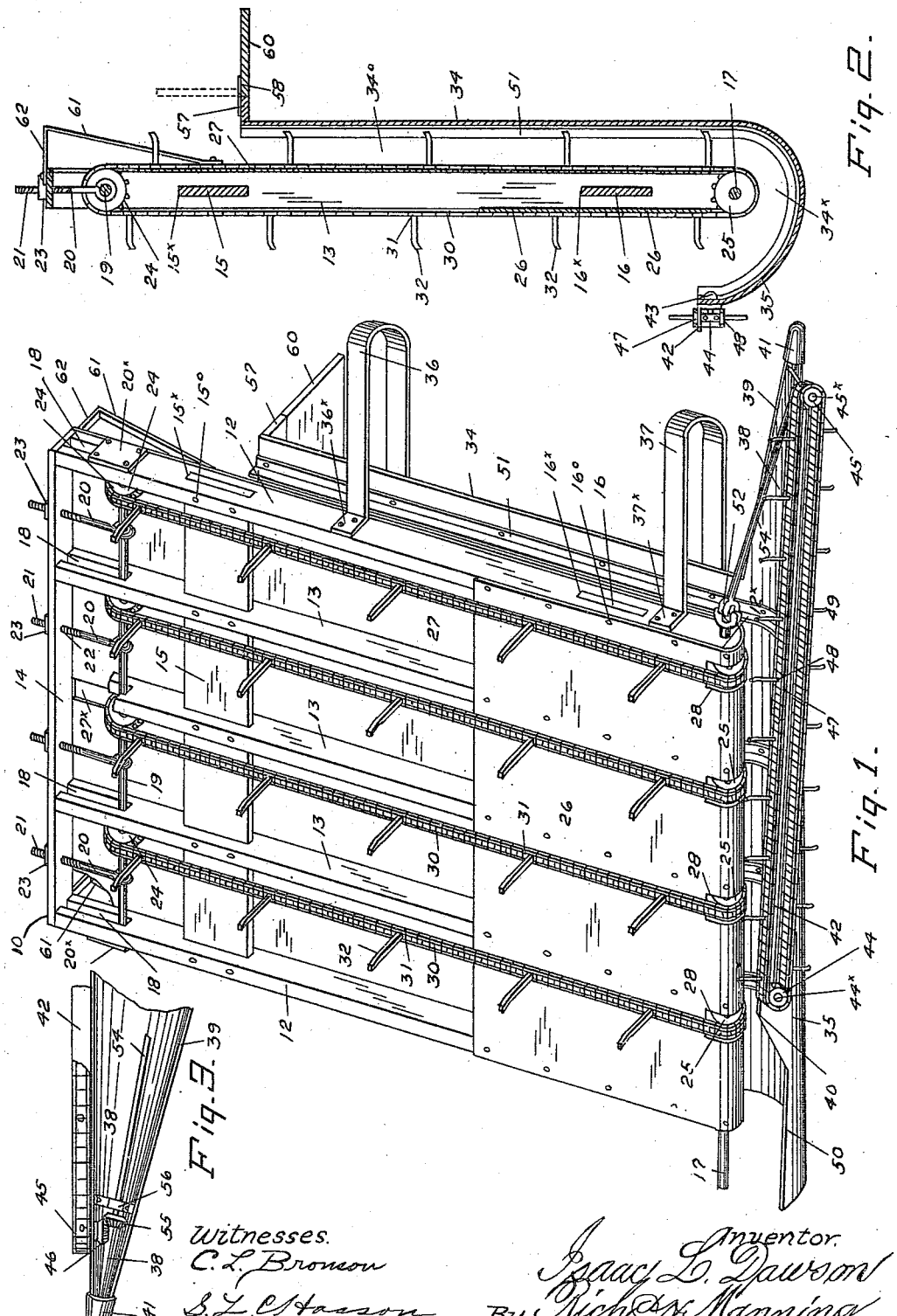

UNITED STATES PATENT OFFICE.

ISAAC L. DAWSON, OF WILLARD, KANSAS.

STALK-ELEVATOR FOR CORN-HARVESTERS.

985,573.  Specification of Letters Patent.  Patented Feb. 28, 1911.

Application filed February 1, 1910. Serial No. 541,389.

*To all whom it may concern:*

Be it known that I, ISAAC L. DAWSON, a citizen of the United States of America, residing at Willard, in the county of Shawnee and State of Kansas, have invented certain new and useful Improvements in Stalk-Elevators for Corn-Harvesters; and I do hereby declare that the following is a full, clear, and exact description of the invention, such as will enable others to make and use the same, reference being had to the accompanying drawing, forming a part of this specification.

The invention relates to elevators for raising from the ground stalks of corn in the path of the corn harvester, in a movement of the harvester in the direction of the rows of corn, and is applicable to the invention in corn harvesters, for which application for Letters Patent was made by me on the 10th day of May, 1907, Serial No. 372,922, renewed August 20, 1909, Serial No. 513,873.

The invention consists in the novel construction and combination of parts, which will be first fully described and then specifically pointed out in the claims.

In the drawings: Figure 1. is an isometric view of the invention. Fig. 2. is a vertical, sectional view of the invention, shown in Fig. 1, the sectional or dividing line bisecting the upper and lower shafts adjacent to the forward surfaces of the sprocket wheels. Fig. 3. is a detail plan view of the forward end portion of the trough, or receiver, for the stalks of corn.

Similar numerals of reference indicate corresponding parts in all the figures of the drawing.

Referring to the drawing, 10 indicates the main supporting frame of the elevator, which consists of the outer side beams for bars 12, of a suitable length and which are spaced apart the required distance for assembling between them a number of stalk conveyers, as further described. These bars 12 are bound together by an upper, transverse bar 14, the ends of which bar 14 are secured flatwise to the upper ends of bars 12. Between the side bars or beams 12, are a series of bars 13, of the same length as bars 12, and which are secured to the upper, transverse bar 14, in like manner. The bars 13 are of the same width and thickness as the bars 12, and are spaced apart at equal distances from each other and from the respective bars 12. The frame 10 is further bound together by the transverse, upper and lower boards or plates 15 and 16, which are of considerable width, respectively, and are of the same length as the upper, transverse bar 15. In the outer or side beams 12, of the frame 10, at considerable distances inwardly from their respective ends, are the longitudinal openings 15$^\times$ and 16$^\times$, respectively, and in the intermediate bars 13 are corresponding openings, registering in position with each other, within which openings are inserted the said boards or plates 15 and 16, respectively. These boards or plates 15 and 16 are further secured by the nails or screws 15°, and 16°, respectively, inserted within the forward surfaces of the bars 12 and 13, and into said boards or plates 15 and 16 respectively. The lower ends of said bars 12 and 13 are curved or rounded in the arc of a circle, as at 12$^\times$, and through said ends extends transversely the elevator-actuating, rotary line shaft 17, the ends of which shaft extend a short distance past the line of the outer surfaces of the outer side bars or beams 12.

In the upper ends of the bars 12 and 13 are longitudinal openings 18, which extend downwardly a short distance from the line of the inner surface of the transverse bar 14, and register with each other in position. In these openings 18 is supported a transverse, rotary shaft 19, the ends of which shaft extend nearly to the line of the outer surfaces of the bars or beams 12. Upon the outer surfaces of the bars 12 and covering the lower portions of the openings 18, are secured the flat plates 20$^\times$, which serve to prevent endwise movement of the shaft 19. This shaft 19 is made adjustable, by means of the series of eye bolts 20, between the bars 13, and between said bars and bars 12, through which eye-bolts the shaft 19 extends. The upper ends of the eye-bolts 20 are screw-threaded at 21, and are extended through openings 22, in the transverse bar 14, and upon said bolts are the adjusting nuts 23, bearing on the outer surface of bar 14. Upon the upper shaft 19, and between the adjusting bolts 20 and the surfaces of the respective bars 13 and 12, in the direction of the right-hand side of frame 10, are the sprocket wheels 24, and upon the lower shaft 17 are sprocket wheels 25, located on said shaft in a line directly beneath the sprocket wheels 24. The diameters of the sprocket wheels 24 and 25 are slightly greater than the widths of the bars 12 and 13, for the purpose further explained.

To the forward surfaces of the bars 12 and 13, at a point about one-third the distance upwardly from the lower ends of said bars is secured firmly the upper end of a face plate 26, which is of the same width as frame 10. This plate 26 extends downwardly, and is bent in a curved line around the lower ends of the bars 12 and 13, and thence extended upwardly on the rear surfaces of said bars to a position immediately below the line of the lower surface of the upper, transverse bar 14, and forms the rear plate 27 to frame 10, in the upper portions of which plate 27 are openings $27^x$, for the sprocket wheels 24. In the portions of the plate 26 extending around the lower portions of the bars 12 and 13, and opposite the sprocket wheels 25, on shaft 17, are openings 28, in which the sprocket wheels are permitted to rotate freely.

Over the sprocket wheels 24 are extended the series of endless sprocket chains 30, which also extend downwardly adjacent to the outer surface of the face plate 26, on the forward side of frame 10, thence over the sprocket wheels 25, on the shaft 17, thence upwardly, adjacent to the outer surface of the back plate 27. Upon the links 31, of the sprocket chains and at proper distances from each other on the respective chains, are secured the pins or fingers 32, which extend outwardly a short distance from the links, and are curved downwardly at their outer ends, so as to effectively elevate the stalks, these fingers being located on said chain in line with each other, in the transverse direction of the frame 10.

34 indicates the back or stalk supporting plate to the elevator. This plate is of the same width as the main frame 10, and is positioned a short distance in rear of the rear plate 27, to frame 10, and slightly beyond the path of movement of the fingers 32, on the elevator chains 30. The plate 34 extends from a position a considerable distance downwardly from the upper end of frame 10, and as shown from a position in a horizontal plane with the lower portion of the transverse boards 15, which bind the upper portion of the bars 12 and 13 together, said plate extending downwardly parallel with the rear plate 27, of frame 10 and to a point opposite the lower shaft 17, from which point the plate is extended beneath the lower end of frame 10, in a curved line concentric with the path of movement of the outer ends of fingers 32, on the sprocket chains 30, in passing around the sprocket wheels 25, and forming thereby the throat $34^x$, to the elevator. From the throat of the elevator the plate 34 is extended upwardly, opposite the lower portion of face plate 26, and extended forwardly at a considerable distance from the path of movement of the fingers 32, forming the stalk or receiver trough 35, of the elevator.

The back plate 34 is held rigidly in position, and at the precise distance from frame 10 to form an elevator passage $34^\circ$, by means of the forwardly-extended U-shaped castings or braces 36 and 37, secured respectively to the upper and lower portions of the forward edge of the back plate 34 of the elevator at one end, and the other ends bent outwardly at $36^x$, $37^x$, at an angle and secured to the forward surface of the forward bar 12, of frame 10.

The trough 35 is extended in length from the line of the forward edge of the back plate 34, a considerable distance for the elevation of stalks lying upon the ground, as seen at 38. The upper, rear surface of the extended portion 38, of the trough is inclined at 39, from the forward, vertical edge of plate 34, forwardly and downwardly.

The upper edge of the forward portion of trough 35 is inclined from a point 40, a short distance from the line of the inner end of the trough to the outer end of the extension 38, of the trough, downwardly nearly to the line of the lower, inner surface of extension 38, thus narrowing the forward end of said extension, to form a toe, and over said narrowed end portion of the extension of the trough is extended a toe plate 41, the edges of which plate are secured to the edges of the said extension 38, of the trough. To the forward surface of trough 35 is secured an angle plate 42, which extends from a point a short distance forward of the point 40, on the trough forwardly to a point a short distance in rear of the toe plate 41, and is connected with said outer surface of the trough a short distance below and parallel with the inclined forward edge of said trough, the upper portion of the angle plate extending outwardly and horizontally from the trough, as seen in Fig. 3, the inner portion of the angle plate being secured by the rivets 43.

Adjacent to the rear of the angle plate 42, and connected with the outer surface of the trough is a pivot $44^x$, upon which is mounted a sprocket wheel 44, and adjacent to the other, or forward end is a short rotary shaft $45^x$ extending through the trough, upon the outer end of which shaft is a sprocket wheel 45, and on the inner end of which shaft is a bevel gear wheel 46. Over the sprocket wheel 44 is extended an endless sprocket chain 47, which is also extended over the sprocket wheel 45, the chain passing in parallel planes with the upper and lower surfaces of the angle plate 42. Upon the links 48, of the sprocket chain, are secured at proper distances apart, on the chain 47, the fingers or pins 49, which extend outwardly a short distance from the links.

From the point 40, on the forward edge of the trough 35, the forward portion of the trough is cut away at 50. This is for the purpose of attachment to a stalk harvesting machine employing rotary cutting knives, the space 50 permitting the stalks to be cut and fall forward into the trough 35.

It will be observed that in the use of the elevator upon a harvesting machine the position is as seen in Fig. 1, inclined rearwardly at an angle in the proper degree. On the inner surface of the back plate 34 are the strips or ribs 51, arranged at proper distances from the path of the fingers 32, on the sprocket chain 30. These ribs extend downwardly to the trough 35, thence in a curved line with the inner surface of the trough to its forward edge, and form the bearing surface upon which the stalks are brought in contact when deposited in the trough 35, and also on being elevated therefrom the ribs 51 enabling the fingers 32 to reach over and draw the outermost stalks into the throat of the trough, thence under and raise the stalks into the elevator passage 34°. This movement is accomplished by means of the power communicated by the main power shaft 17. With the forward end of this shaft is connected a knuckle-joint 52, with which joint is connected the rear end of a short power-transmitting shaft 54, the forward end of which shaft extends at an angle to shaft 17, forwardly and downwardly to a point opposite the bevel gear 46, and upon said end is a bevel gear 55, meshing with the gear 46. The forward end of the shaft is supported in position and journaled on a transverse shaft-hanger 56, secured at its ends to the respective opposite inner surfaces of the sides of the forward, extended portion 38, of the trough 35. (See Fig. 3).

For the purpose of diverting the stalks raised by the elevator in passage 34°, with the outer surface and upper edge of the back plate 34 is connected fixedly a transverse plate 57, extending at right angles therefrom, to which is hinged, at 58, a stalk diverting board 60, which serves to divert the stalks to the shocker in corn harvesting machines. With the inner surface of the back plate 27, to frame 10, a short distance above the line of the upper end of plate 34, is connected rigidly the lower end of a stalk diverting bar 61, which is inclined rearwardly from said back plate 27, and extended upwardly to a position near the line of the upper, transverse bar 14, of frame 10, then bent at an angle at 62, and said portion secured rigidly to said bar 14, the purpose of said bar being to divert the stalks from the fingers 32, on the sprocket chain 30, when said fingers approach said bar 61. A number of these bars 61 may be employed, as preferred, and secured to the back plate 27, in like position.

In operation the power from shaft 17 actuates the sprocket chains 30, in a direction to cause the fingers 32, on said chains, to move downwardly in the direction of the trough 35. At the same time the power from shaft 17 is transmitted through the transmitting shaft 54, to the bevel gears 55 and 46, reversing the direction of rotation of the latter, and causing the sprocket chain 47 to move with its series of fingers 49 rearwardly, toward the inner end of the trough 35, upon reaching which point, the stalks are carried into the throat or space 50, where they are cut by the rotary cutting knives and the stalks fall forwardly in the longitudinal direction of, and into the trough 35, and are there engaged by the elevator teeth or fingers 32 on the sprocket chains moving downwardly into the trough and carrying the stalks upwardly from the trough on the ribs 51, on the inner surface of the back plate 34, to the upper end of the elevator.

The toe 41, on the extended, forward end of the trough, is adapted to raise a fallen stalk, so that the fingers 49, on the sprocket chain 47, will carry the stalk rearwardly until cut, the standing corn which needs no support falling at the same time forwardly, into the trough 35, the fingers 32, on the elevator chains 30, moving the stalks from the trough into the throat 34ˣ, thence into the passage 34°, and upwardly in the passage, until the stalks guided by the ribs 51, are diverted by the bars 61, from the sprocket wheels 24, and fall over the surface of the hinged board 60, to their proper receptacle, such as a corn shocker well known in the corn harvesting machine.

It is obvious that various changes in construction may be resorted to, within the scope of the appended claims.

Having fully described my invention, what I now claim as new and desire to secure by Letters Patent is:

1. In a receiver for stalk elevators, a curved plate or trough having an extended portion and its upper edges inclined inwardly and downwardly in the direction of the forward end, sprocket wheels on the outer surface of the forward portion of said receiver, and a sprocket chain on said sprocket wheels, and stalk-lifting fingers on said chain.

2. In a receiver for stalk elevators, a curved plate or trough having its upper edge portions inclined forwardly and downwardly in the direction of its forward end, a plate upon the outer surface of the forward portion of said trough extending in the longitudinal direction thereof, sprocket wheels upon said trough at the ends of said plate, and a sprocket chain on said sprocket wheels movable in the longitudinal plane of said plate, stalk lifting fingers on said chain, and means actuating said sprocket wheels.

3. In stalk elevators, a main supporting frame, and transverse upper and lower rotary shafts carried by said frame, sprocket wheels on said shaft, and sprocket chains, stalk conveying fingers on said chains, a curved plate or trough supported by the main frame adjacent to the lower end thereof, said plate having a forwardly-extended end portion and the upper edges thereof inclined downwardly and forwardly in the direction of its forward end, a sprocket wheel upon the outer surface and rear end of said trough, and a transverse shaft extending through said trough near its forward end, a sprocket wheel on the outer end of said shaft, and a bevel gear on the inner end, a sprocket chain on said sprocket wheels, and a power-transmitting shaft yieldingly connected with the lower rotary shaft, on the main frame, and a bevel gear on said power-transmitting shaft meshing with the bevel-gear wheel on the shaft carried by said trough.

ISAAC L. DAWSON.

Witnesses:
GEO. WILSON,
W. E. WILSON.

Copies of this patent may be obtained for five cents each, by addressing the "Commissioner of Patents, Washington, D. C."